(12) United States Patent
Paris

(10) Patent No.: US 10,427,501 B2
(45) Date of Patent: Oct. 1, 2019

(54) OUTLET DEVICE

(71) Applicant: Faurecia Innenraum Systeme GmbH, Hagenbach (DE)

(72) Inventor: Jérôme Paris, Livry-Gargan (FR)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 113 days.

(21) Appl. No.: 15/394,013

(22) Filed: Dec. 29, 2016

(65) Prior Publication Data

US 2017/0190240 A1 Jul. 6, 2017

(30) Foreign Application Priority Data

Dec. 30, 2015 (DE) .................. 10 2015 017 008

(51) Int. Cl.
*B60H 1/00* (2006.01)
*B60H 1/34* (2006.01)

(52) U.S. Cl.
CPC ......... *B60H 1/345* (2013.01); *B60H 1/00564* (2013.01); *B60H 1/3442* (2013.01)

(58) Field of Classification Search
CPC ...... B60H 1/345; B60H 1/34; B60H 1/00564; B60H 1/3442
USPC .................................................. 454/152, 76
See application file for complete search history.

(56) References Cited

U.S. PATENT DOCUMENTS

| | | | | |
|---|---|---|---|---|
| 4,006,673 A | * | 2/1977 | Meyer | B60H 1/3442 251/352 |
| 4,231,513 A | * | 11/1980 | Vance | F24F 13/06 236/49.5 |
| 5,356,336 A | * | 10/1994 | Stouffer | B60H 1/34 454/155 |
| 8,100,547 B2 | * | 1/2012 | Hogh | B60H 1/34 362/523 |

(Continued)

FOREIGN PATENT DOCUMENTS

DE 102007019602 B3 6/2008
DE 102013210055 B3 9/2014

(Continued)

OTHER PUBLICATIONS

German Office Action in German with English translation for DE application No. 102015017008.2, dated Aug. 3, 2017, 8 pages.

*Primary Examiner* — Vivek K Shirsat
*Assistant Examiner* — Ryan L Faulkner
(74) *Attorney, Agent, or Firm* — Reising Ethington P.C.

(57) ABSTRACT

An outlet device (1) for ventilation of a vehicle interior has a housing (H) with an outer air guide surface (10*a*), and inner guide surface (30*a*), a guiding device (G), and an airflow adjustment member (63). The inner and outer air guide surfaces form an outlet flow channel (22) which extends between an air inlet orifice (11) and an air outlet orifice (12). The outlet flow channel (22) includes a first circumferential section (23*a*) and a second circumferential section (23*b*). An inlet air flow which passes the air inlet orifice (11) produces a first air flow component flowing (Continued)

therethrough and the second circumferential section (23b) produces a second air flow component flowing therethrough. The directions of the first and second circumferential sections meet each other in an intersecting point (P) which lies outside the housing (H). The airflow adjustment member allows changes to the ratio of the volumetric flows of the intersecting first and second air flow components.

10 Claims, 5 Drawing Sheets

(56) References Cited

U.S. PATENT DOCUMENTS

| | | | |
|---|---|---|---|
| 9,163,848 B2 * | 10/2015 | Doll | F24F 13/072 |
| 2008/0014855 A1 * | 1/2008 | Leserre | B60H 1/3414 |
| | | | 454/155 |
| 2009/0047892 A1 * | 2/2009 | Brancheriau | B60H 1/3442 |
| | | | 454/162 |
| 2014/0301832 A1 * | 10/2014 | Errick | B60H 1/3407 |
| | | | 415/151 |
| 2014/0306059 A1 * | 10/2014 | Brown | B64D 13/00 |
| | | | 244/118.5 |
| 2014/0357179 A1 * | 12/2014 | Londiche | B64D 13/00 |
| | | | 454/322 |
| 2016/0200178 A1 | 7/2016 | Londiche et al. | |

FOREIGN PATENT DOCUMENTS

| | | | | |
|---|---|---|---|---|
| EP | 2139710 B1 | | 11/2010 | |
| WO | WO 2008128820 A1 * | | 10/2008 | B60H 1/3442 |

* cited by examiner

OUTLET DEVICE

TECHNICAL FIELD

The invention relates to an outlet device for ventilation of air in a vehicle interior.

BACKGROUND

From US 2014/0357178 A1 an air vent is known.

SUMMARY

It is an object of the invention to provide an outlet device for ventilation of air in a vehicle interior, which is formed by a relatively simple construction and which allows different designs.

This and other objects are met by the invention of claim 1. Further embodiments are stated in the related subordinate claims.

According to an embodiment of the invention there is provided an outlet device for ventilation of a vehicle interior, the outlet device comprising a housing with:
an outer air guide surface which extends between an air inlet orifice and an air outlet orifice lying contrary to the air inlet opening with respect to a housing axis of the housing, wherein the outer air guide surface extends continuously closed around the housing axis,
an inner air guide surface which extends continuously closed around the housing axis and is spaced away from and faces toward the outer air guide surface, wherein the inner air guide surface and the outer air guide surface form an outlet flow channel, wherein an end section of the outlet flow channel which forms the air outlet orifice comprises at least a first circumferential section and a second circumferential section which are disposed with regard to the housing axis in a circumferential distance to each other, wherein the directions of the first circumferential section and the second circumferential section meet each other in an intersection point which lies outside the housing at the side of the air outlet orifice, so that, caused by an inlet air flow which passes the air inlet orifice, a first air flow component flowing through the first circumferential section and a second air flow component flowing through the second circumferential section deflect each other after exiting the housing,
an airflow adjustment member which has a cross-sectional diameters perpendicular to the housing axis each of which is smaller than the cross-sectional diameter of the outlet flow channel at the same position of the housing axis in the same direction, and which is movable in a direction across the housing axis for obstructing an air flow in one of the first or second circumferential section and for changing the ratio of the volumetric flows of the first and second air flow component and thereby the direction of the outlet flow, and
a guiding device for guiding the airflow adjustment member in a direction across the housing axis.

The first circumferential section and the second circumferential section may be particularly directed towards each other when viewed across the housing axis such that the directions of the first circumferential section and a second circumferential section meet each other in an intersecting point which lies outside the housing at the side of the air outlet orifice.

Particularly, the airflow adjustment member may be coupled to and guided by the first guiding device and thereby moveable between a first adjustment state in which the airflow adjustment member at least partially extends into the first circumferential section and is at least partially removed from the second circumferential section and a second adjustment state in which the airflow adjustment member is at least partially removed from the first circumferential section and extends at least partially into the second circumferential section in order to change the ratio of the volumetric flows of the first and second air flow component and thereby changing the direction of the outlet flow.

According to another embodiment of the invention, an outlet device for ventilation of a vehicle interior by generating an outlet flow is provided, comprising a housing with:
an outer air guide surface,
an inner air guide surface which is spaced away from and faces toward the outer air guide surface, wherein the inner air guide surface and the outer air guide surface form an outlet flow channel which extends between an air inlet orifice and an air outlet orifice lying contrary to the air inlet opening with respect to a housing axis of the housing, wherein an end section of the outlet flow channel which forms the air outlet orifice at the air outlet orifice comprises at least a first circumferential section and a second circumferential section which are disposed with regard to the housing axis in a circumferential distance to each other and which can lie opposite to each other and which extend towards each other when viewed across the housing axis, so that an inlet air flow which passes the air inlet orifice the first circumferential section produces a first air flow component flowing therethrough and the second circumferential section produces a second air flow component flowing therethrough which air flow components intersect each other after exiting the housing,
a guiding device and
an airflow adjustment member connected to and guided in the guiding device and thereby moveable between a first adjustment state in which the airflow adjustment member at least partially extends into the first circumferential section and is at least partially removed from the second circumferential section and a second adjustment state in which the airflow adjustment member is at least partially removed from the first circumferential section and extends at least partially into the second circumferential section in order to change the ratio of the volumetric flows of the intersecting first and second air flow component.

According to an embodiment of the outlet device, the outer air guide surface and the inner air guide surface extend circumferentially within the housing so that the first circumferential section and the second outlet channel section are sections within a continuous flow channel having preferably an annular geometry. Particularly, the first circumferential section and the second circumferential section are lying diametrically opposite to each other. Particularly, the outlet flow channel can have an annular cross-section. Further, in this regard, the inner air guide surface and the outer air guide surface forming the outlet flow channel can have a circular profile.

Generally, the adjustment member can have a circular shape when viewed in the direction of the housing axis.

According to an embodiment of the outlet device, the guiding device provides a rotationally movement of the airflow adjustment member around the housing axis.

According to an embodiment of the outlet device, the guiding device provides a translationally movement of the airflow adjustment member which is directed across the housing axis.

According to an embodiment of the outlet device, the outlet device comprises an inner body which is located in the housing and fixed thereto, the inner body comprising a first end facing the air inlet orifice, a second end being oriented contrary to the first end, the inner air guide surface which faces the outer air guide surface and which forms the outlet channel section lying between the inner air guide surface and the outer air guide surface.

The housing can particularly comprise:
- a housing wall with an inner surface forming a channel which extends between an air inlet orifice and an air outlet orifice lying contrary to the air inlet opening with respect to a housing axis of the housing,
- an inner body which is located in the housing and fixed thereto, the inner body comprising a first end facing the air inlet orifice, a second end being oriented contrary to the first end, an outer air guide surface which faces the inner surface and which forms an outlet channel section of the channel lying between the outer air guide surface and the inner surface, and a through-hole which extends along the housing axis through the inner body, According to an embodiment of the outlet device, the outlet device comprises an actuation device and the guiding device for guiding the actuation device or a sleeve device thereof at the housing across the direction of the housing axis of the housing, when the adjustment member is in an opening position and at least partially removed from the housing wall. The embodiment of the outlet device can comprise:
- the sleeve device which extends through the through-hole and which comprises a passageway extending through the sleeve device,
- an actuation rod being moveably disposed within the passageway and guided therein, the actuation rod comprising a first rod end and a second rod end which is disposed contrary to the first rod end,
- a adjustment member fixed at the second rod end, wherein the adjustment member in a first rod position circumferentially contacts the inner surface in a closing position and thereby closes the channel and wherein the adjustment member, when the same is moved in a direction of the housing axis into a second rod position opens the channel in an opening position, Generally, the movement of the actuation rod can be provided manually or by a drive unit, for example a motor or an actuator, connected to the actuation rod.

One advantage of at least some embodiments of the invention is that the outside air flow resulting from the collision of the flows is delivered by different air channel sections has a direction depending of the respective air flow quantities delivered by the channel sections. If the flow of the different air channel sections equals, the resulting direction is in the middle of the outward directions of the channel sections, more in particular in a direction along the housing axis. If the flow rate delivered by one channel section is lower, the resulting outside airflow has a direction closer to the other channel section outward direction.

Further advantages of various embodiments are as follows. No more plurality of fins at the outlet, neither movable surface. The external appearance of the air vent does not substantially change according the flow direction chosen, except the position and/or orientation of a control knob, if present. The outlet can be cleaned easily. Less mobile parts which reduce assembly cost.

According to an embodiment of the outlet device of the invention the housing comprises a recess in its outlet section through which the sleeve device extends, the recess having a form which largest width is larger than the diameter of an axial section of the sleeve device lying within the recess so that the sleeve device can be moved at least in a first vertical direction across the direction of the housing axis, when the adjustment member is in an opening position, wherein thereby the adjustment member is moved in the first vertical direction from a neutral position to a dislocated position in order to deviate the direction of the outlet flow.

According to an embodiment of the outlet device of the invention in which the air flow adjustment member is movable along the housing axis, the outlet device comprises a positioning device which is coupled to the actuation rod and the sleeve device and which is configured to move the actuation rod between the first and the second position relative to the sleeve device. In this regard, the positioning device can be configured such that the same provides the first and the second position both as stable positions. The positioning device can be realized as a push-push-mechanism.

According to an embodiment of the outlet device of the invention, the outlet device comprises a guiding device for guiding the sleeve at the housing across the housing axis of the housing. In this regard, the guiding device can be realized such that the same provides a guided movement of the sleeve device relative to the housing across the housing axis of the housing.

Particularly, the guiding device can be realized by guiding surfaces of the sleeve device and of the housing which alternately face and engage or contact each other so that the sleeve device is in a fixed position with regard to the housing axis during movement of the sleeve across the housing axis.

According to an embodiment of the outlet device of the invention, the outlet device comprises a biasing device which comprises a first surface facing the air inlet opening and which is pressed against a bearing surface of the sleeve device facing the air outlet orifice and a second surface lying contrary to the first surface and which is pressed against a second bearing surface of the housing, wherein the biasing device is biased such that the first and second surface of the biasing device are pressed apart from each other. Particularly, the biasing device can be a pressure spring.

Herein with the expression "along" with regard to a reference direction or a reference axis, particularly in the context with the indications of a specific direction or specific axis, generally means that the respective direction or respective axis deviates locally with a minimal angle of 315 degrees and with a maximal angle of 45 degrees and preferably with a minimal angle of 22.5 degrees from the reference direction or reference axis.

Herein with the expression "across" with regard to a reference direction or a reference axis, particularly in the context with the indications of a specific direction or specific axis, generally means that the respective direction or respective axis deviates locally with an angle which amounts between 45 degrees and 135 degrees and preferably with an angle which amounts between 67.5 degrees and 112.5 degrees from the reference direction or reference axis.

Herein the end section of the outlet flow channel is particularly defined as having a length along the housing axis which amounts to 1/20 of smallest diameter of the inner air guide surface at the air inlet opening at the second end.

Further, herein generally the direction of end section of the outlet flow channel is the direction of the connection line of the centroids of a respective circumferential section of the cross-sections of the end section along the housing axis. Therein, the circumferential sections of the cross-sections are defined such that these lie side by side or coexisting when viewed along the housing axis and can have a width in the circumferential direction which amounts to 1/10 of smallest diameter of the inner air guide surface at the air inlet opening. If this connection line is a curved line a straight line is taken for which the integral of the distances to the connection line is a minimum. In an alternative definition, the direction of the end section of the outlet flow channel is the direction in which the air flow is directed when leaving the channel at the outlet orifice.

The outlet device is particularly designed such that the position of the intersection point lies in a distance from the air outlet orifice which at minimum amounts for example to half of the diameter of the inner air guide surface at the air outlet orifice. Further, in this combination or per se, the intersection point lies in a distance from the air outlet orifice which at maximum amounts for example to ten times the smallest diameter of the inner air guide surface at the air outlet orifice.

BRIEF DESCRIPTION OF THE DRAWINGS

The foregoing and other objects and features and advantages of the present invention will be understood from the following detailed description in connection with the accompanying drawings which show.

DETAILED DESCRIPTION OF THE ILLUSTRATED EMBODIMENTS

Figure 1:
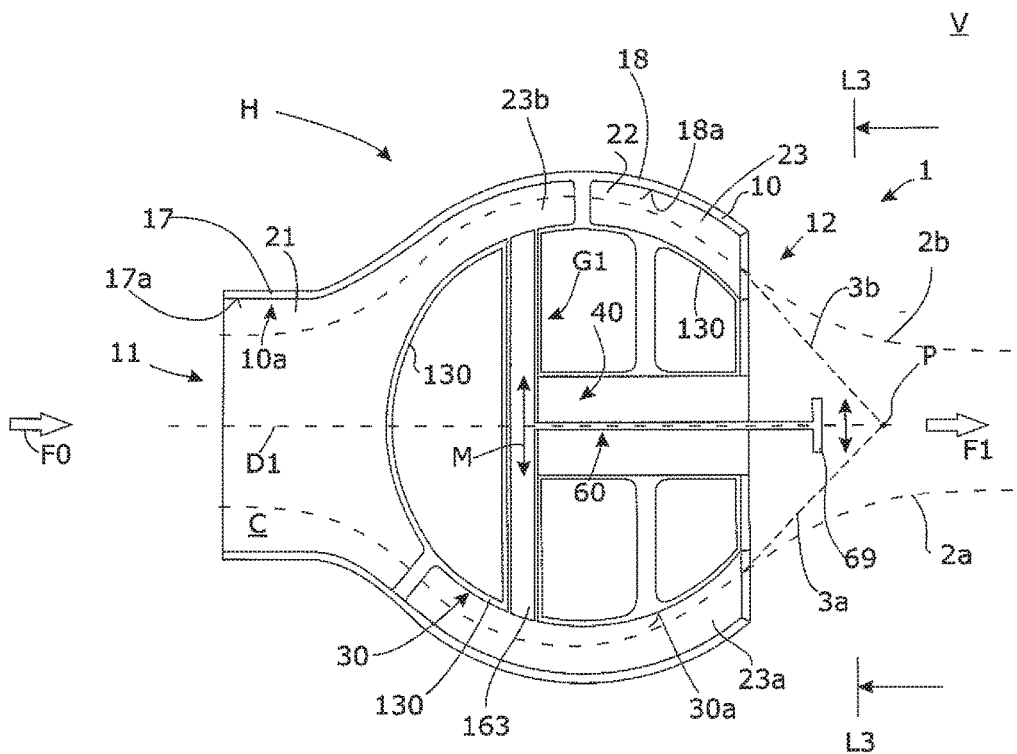
FIG. 1 a diagrammatic section view of a first embodiment of the outlet device according to the invention, wherein the outlet device comprises an outlet flow channel and an airflow adjustment member, wherein the outlet flow channel is defined by an outer air guide surface and an inner air guide surface, wherein the airflow adjustment member takes a neutral position, FIG. 2 a cross-sectional view of the embodiment of the outlet device of FIG. 1, wherein the view of FIG. 2 is taken along line L2-L2 of FIG. 1, FIG. 3 a front view of the embodiment of the outlet device of FIG. 1, wherein the front view is defined by line L3-L3 of FIG. 1, FIG. 4 a side view of the embodiment of the outlet device of FIG. 1, wherein the airflow adjustment member take an extended position in which the airflow adjustment member partially extends in a circumferential section of the outlet flow channel, FIG. 5 a sectional view of the embodiment of the outlet device of FIG. 1, wherein the sectional view is defined by line L5-L5 of FIG. 4, FIG. 6 a diagrammatic section view of a further embodiment of the outlet device according to the invention with an housing comprising an inner body disposed therein and an actuation device with an actuation rod and an adjustment member, wherein the outlet device is shown in an operational state in which the adjustment member is in an opened position with regard to the housing and the adjustment member is in a neutral position with regard to the housing axis of the housing, FIG. 7 the outlet device of FIG. 6 in the diagrammatic section view of the same, wherein the outlet device is shown in an operational state in which the adjustment member is in a closed position with regard to the housing and the adjustment member is in a neutral position with regard to the housing axis of the housing, FIG. 8 the outlet device of FIG. 6 in the diagrammatic section view of the same, wherein the outlet device is shown in an operational state in which the adjustment member is in an opened position with regard to the housing and the adjustment member is in a half dislocated position with regard to the housing axis of the housing so that the outlet flow direction is partially deviated, FIG. 9 the outlet device of FIG. 6 in the diagrammatic section view of the same, wherein the outlet device is shown in an operational state in which the adjustment member is in an opened position with regard to the housing and the adjustment member is in a more dislocated position with regard to the state shown in FIG. 8 so that the outlet flow direction is deviated more.

An embodiment of the outlet device 1 for ventilation of a vehicle interior V according to the invention is shown in FIG. 1. The outlet device 1 comprises a channel C which aerodynamically connects an air inlet orifice 11 and an air outlet orifice 12 lying contrary to the air inlet opening 11 with respect to a housing axis D1 of the housing H. Particularly, the outlet device 1 comprises a housing H having an outer air guide surface 10a and an inner air guide surface 30a which is spaced away from and faces toward the outer air guide surface 10a. The inner air guide surface 30a and the outer air guide surface 10a form an annular outlet flow channel 22 which at least partially extends between an air inlet orifice 11 and an air outlet orifice 12 lying contrary to the air inlet opening 11 with respect to a housing axis D1 of the housing H. In the embodiment of FIG. 1 the channel C comprises an inlet flow channel 21 with the air inlet orifice 11 as an outer end thereof and the outlet flow channel 22 which joins the inlet flow channel 21 by forming the channel C and which has the air outlet orifice 12 as an outer end thereof. In this regard, the outlet flow channel 22 is a part of a channel C with regard to the housing H so that the inner air guide surface 30a and the outer air guide surface 10a partially delimit a channel C which extends along a housing axis D1 of the housing H.

Figure 4:
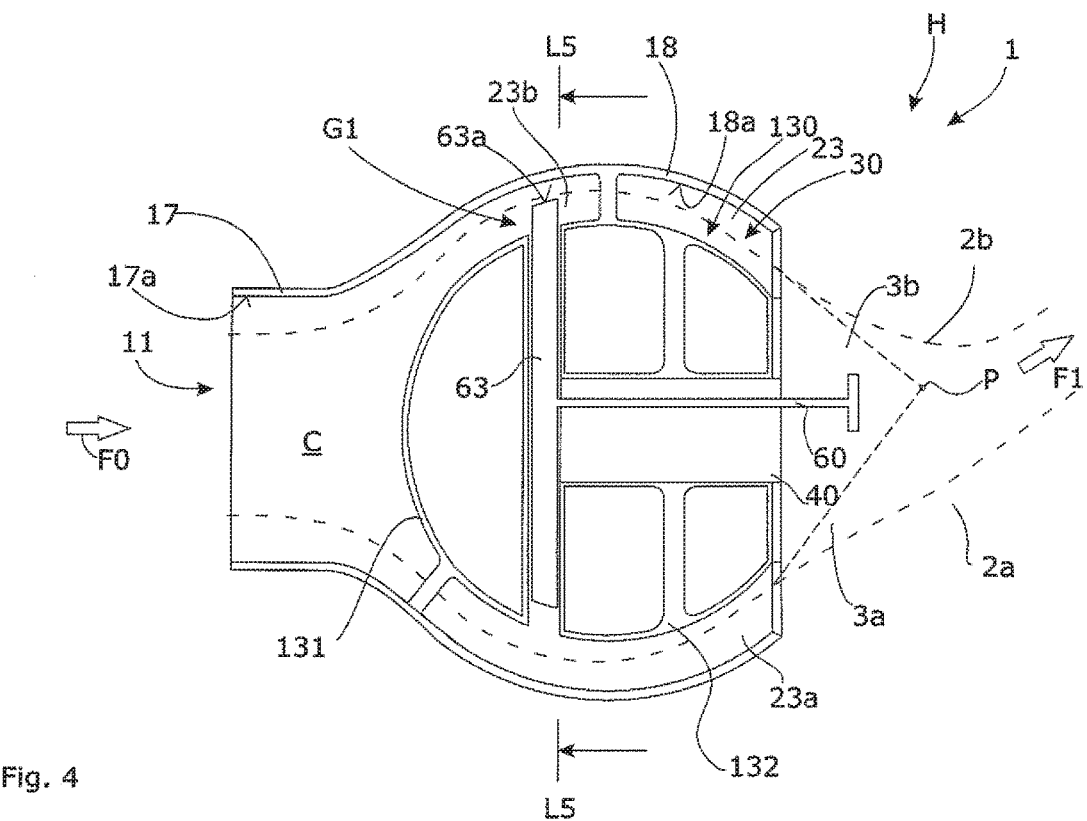

In this embodiment, referring to FIGS. 1 and 4, the outlet device 1 comprises a wall device 130, which comprises a main wall 131 and a holding wall 132. The main wall 131 and the holding wall 132 lie behind each other when viewed along the housing axis D1. The holding wall 132 lies on the side of the air inlet opening 11 and the main wall 131 lies on the side of the air outlet opening 12. The main wall 131 and the holding wall 132 form a space for receiving the adjustment member 163 such that it can be moved in a direction across the housing axis D1. The inner air guide surface 30a is an outer surface of wall device 130 which form an inner body. The main wall 131 and the holding wall 132 can be formed as separate parts so that the main wall 131 and the holding wall 132 are separated from each other. The main wall 131 and the holding wall 132 can be fixed to the housing wall 1 for example by a rip. Alternatively the main wall 131 and the holding wall 132 can be formed as a single part. Particularly in this context, the main wall 131 or the holding wall 132 can be fixed to the housing wall 1 for example by a rip and the main wall 131 and the holding wall 132 can be joined by a connecting part. In this regard, the adjustment member 163 can comprise an opening through which the connecting part extends.

The outlet device 1 further comprises an inner air guide surface 30a which extends continuously closed around the housing axis D1 and is spaced away from and faces toward the outer air guide surface 10a. The inner air guide surface 30a and the outer air guide surface 10a form an outlet flow channel 22. An end section 23 of the outlet flow channel 22 forms the air outlet orifice 12 and comprises at least a first circumferential section 23a and a second circumferential section 23b which are disposed with regard to the housing axis D1 opposite to each other.

In this embodiment, but also generally herein, the first circumferential section 23a and the second circumferential section 23b are disposed in a circumferential distance to each other. The circumferential distance can be defined to amount to 1/10 of smallest diameter of the inner air guide surface at the air inlet opening. Particularly, the first circumferential section 23a and the second circumferential section 23b can lie opposite to each other with regard to the housing axis D1. The directions of the first circumferential section 23a and the second circumferential section 23b meet each other in an intersection point P which lies outside the housing H at the side of the air outlet orifice 12. Consequently, when an inlet air flow F0 passes the air inlet orifice 11, a first air flow component flows through the first circumferential section 23a and a second air flow component flows through the second circumferential section 23b and the first air flow component and the second air flow component deflect each other after exiting the housing H.

Herein, for illustration the direction of the exiting first air flow component and of the second air flow component are assigned the reference numerals 3a and 3b, respectively, and the streamlines of the exiting first air flow component and of the second air flow component are assigned the reference numerals 2a and 2b Further in this embodiment, but also generally herein, the outlet device 1 also comprises a guiding device G1 for guiding the airflow adjustment member 163. In this embodiment, the guiding device G1 is formed by surfaces of the wall device 130 in order to guide the adjustment member 163 in a movement across the housing axis D1. The adjustment member 163 has a cross-sectional diameters perpendicular to the housing axis D1 each of which is smaller than the cross-sectional diameter of the outlet flow channel 22 at the same position of the housing axis D1 in the same direction. The adjustment member 163 is movable in a direction across the housing axis D1 for obstructing an air flow in one of the first or second circumferential section 23a, 23b and for changing the ratio of the volumetric flows of the first and second air flow component 23a, 23b and thereby the direction of the outlet flow F1.

Figure 6:
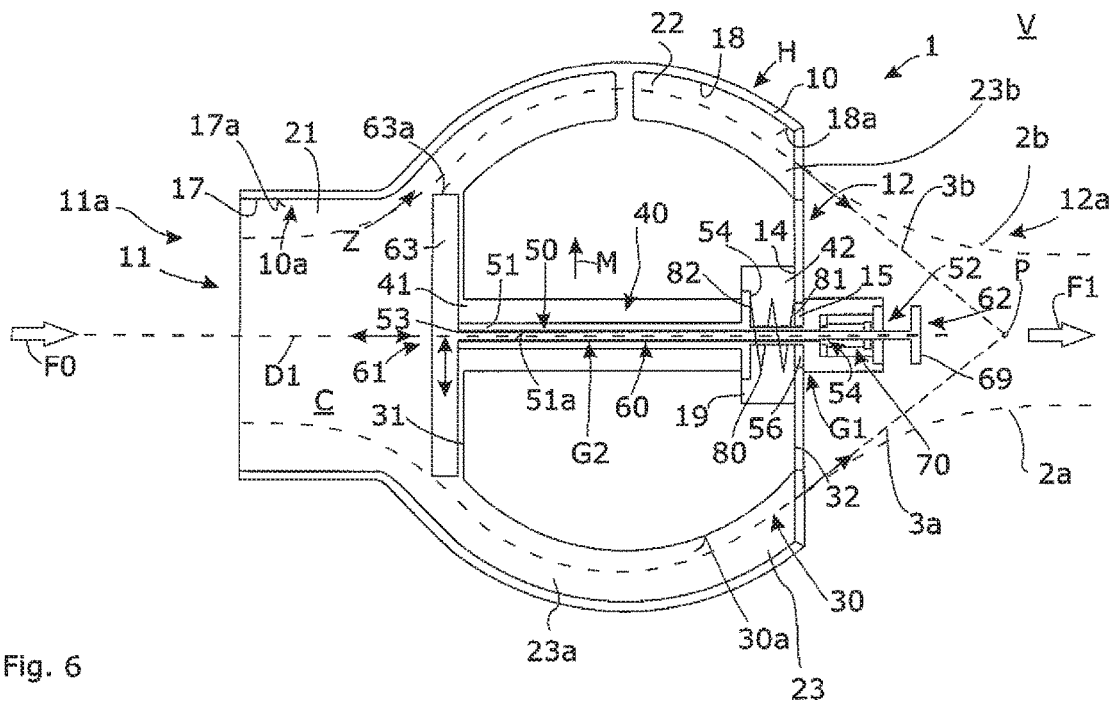

A further embodiment of the outlet device 1 for ventilation of a vehicle interior V according to the invention is shown in FIG. 6. The outlet device 1 comprises a channel C which aerodynamically connects an air inlet orifice 11 and an air outlet orifice 12 lying contrary to the air inlet opening 11 with respect to a housing axis D1 of the housing H. Particularly, the outlet device 1 comprises a housing H having an outer air guide surface 10a and an inner air guide surface 30a which is spaced away from and faces toward the outer air guide surface 10a. The inner air guide surface 30a and the outer air guide surface 10a form an outlet flow channel 22 which at least partially extends between an air inlet orifice 11 and an air outlet orifice 12 lying contrary to the air inlet opening 11 with respect to a housing axis D1 of the housing H. In the embodiment of FIG. 6 the channel C comprises an inlet flow channel 21 with the air inlet orifice 11 as an outer end thereof and the outlet flow channel 22 which joins the inlet flow channel 21 by forming the channel C and which has the air outlet orifice 12 as an outer end thereof. In this regard, the outlet flow channel 22 is a part of a channel C with regard to the housing H so that the inner air guide surface 30a and the outer air guide surface 10a partially delimit a channel C which extends along a housing axis D1 of the housing H.

According to the embodiments shown, a housing wall 10 with an outer air guide surface 10a or the housing H forms an air inlet orifice 11 at a first axial end 11a thereof and an air outlet orifice 12 at a second axial end 12a thereof lying contrary to the air inlet opening 11 with respect to the housing axis D1. In this regard the housing wall 10 comprises an inlet section 17 of the channel C with an inlet section surface 17a of the outer air guide surface 10a at its inner side and an outlet section 18 of the channel C with an outlet section surface 18a at its inner side which is joined to the inlet section surface 17a when viewed in the housing axis D1. The inlet section surface 17a and the outlet section surface 18a form the outer air guide surface 10a. The inlet section 17 is formed by the inlet section surface 17a and the outlet section 18 is lying between the outlet section surface 18a and the inner air guide surface 30a.

Generally, the inner air guide surface 30a can be a surface of an inner wall 130 (FIG. 1) or a surface of an inner body 30 being located within the outer air guide surface 10a (FIG. 6) and fixed thereto. The surfaces of the inner wall 130 (FIG. 1) and of the inner body 30, respectively, which face the outlet section surface 18a form an air displacement body and provide a flow surface.

The outlet flow channel 22 comprises an end section 23 with respect to the housing axis D1. The end section 23 forms the air outlet orifice 12. Further the outlet flow channel 22 or the end section 23 comprises at least a first and a second circumferential section 23a, 23b which are disposed in a circumferential direction with regard to the housing axis D1 in a distance to each other. The first and a second circumferential section 23a, 23b extend towards each other when viewed across the housing axis D1, so that by an inlet air flow which passes the air inlet orifice 11 the two outlet channel sections 22 produce a first air flow component flowing through the first circumferential section and a second air flow component flowing through the second circumferential section which intersect each other after exiting the housing H. The first and a second circumferential section 23a, 23b are partial sections of one continuous end section 23.

An end section 23 of the outlet flow channel 22 is an outer end section thereof and forms the air outlet orifice 12. The end section 23 of the outlet flow channel 22 comprises at least a first circumferential section 23a and a second circumferential section 23b which are disposed in a circumferential direction with regard to the housing axis D1 in a circumferential distance to each other. When an inlet air flow passes the air inlet orifice 11, a first air flow component flows through the first circumferential section 23a and a second air flow component flows through the second circumferential section 23b. The first circumferential section 23a and the second circumferential section 23b extend towards each other when viewed across the housing axis D1, so that, when an inlet air flow passes the air inlet orifice 11, the directions 3a, 3b of the first air flow component and of the second air flow component intersect each other after exiting the housing H in an intersecting point P.

Figure 2:
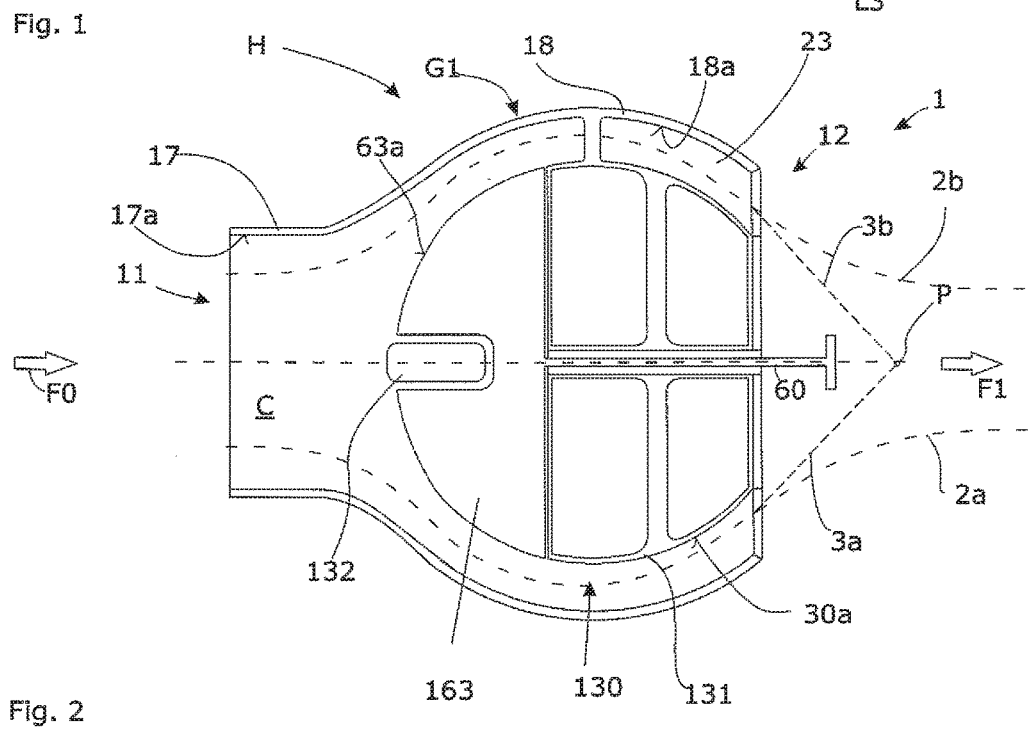
Figure 3:
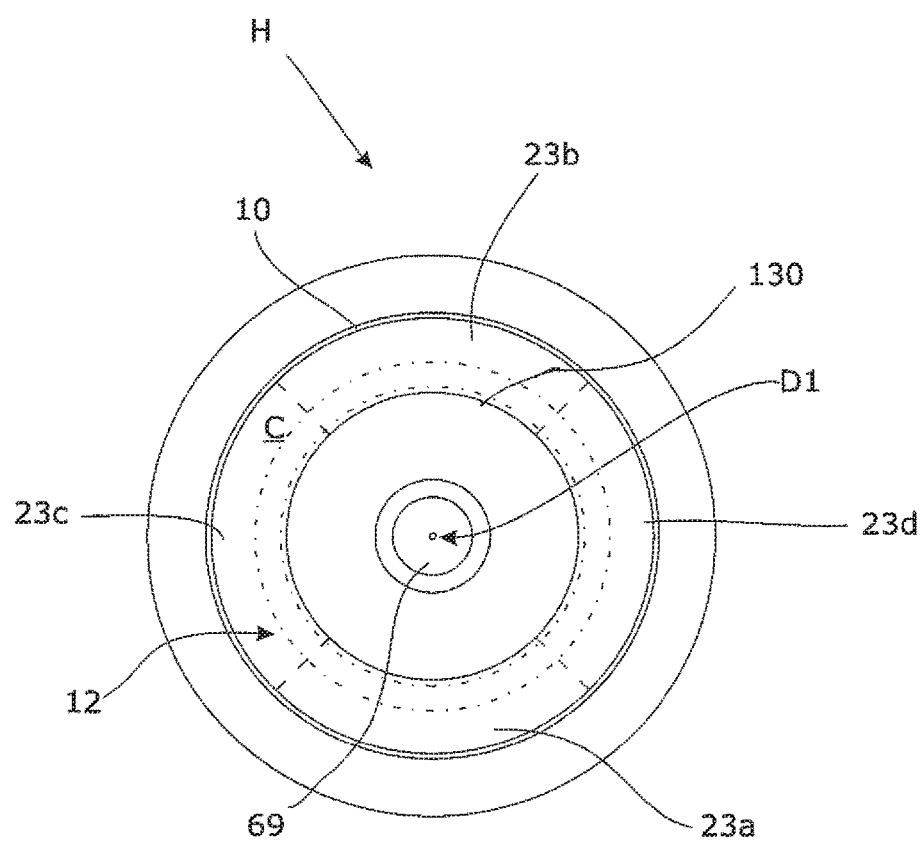

As can be seen in FIG. 3, the embodiment shown comprises an end section 23 which is a circumferentially closed channel section so that there are further circumferential sections 23c, 23d lying between the first circumferential section 23a and the second circumferential section 23b and opposite to each other. In the embodiment of FIGS. 1 and 2, also the circumferential sections 23c, 23d extend towards each other when viewed across the housing axis D1, so that, when an inlet air flow passes the air inlet orifice 11, the air flow components flowing therethrough intersect each other after exiting the housing H. Further, in this embodiment, the directions of the circumferential sections for producing air flow components, when viewed across the housing axis D1, intersect each other after exiting the housing H do not need to lie opposite to each other and could lie beneath each other. Particularly, the air vent can designed such that the flow directions from all outlet positions of the air outlet orifice 12 intersect in point P.

Figure 7:
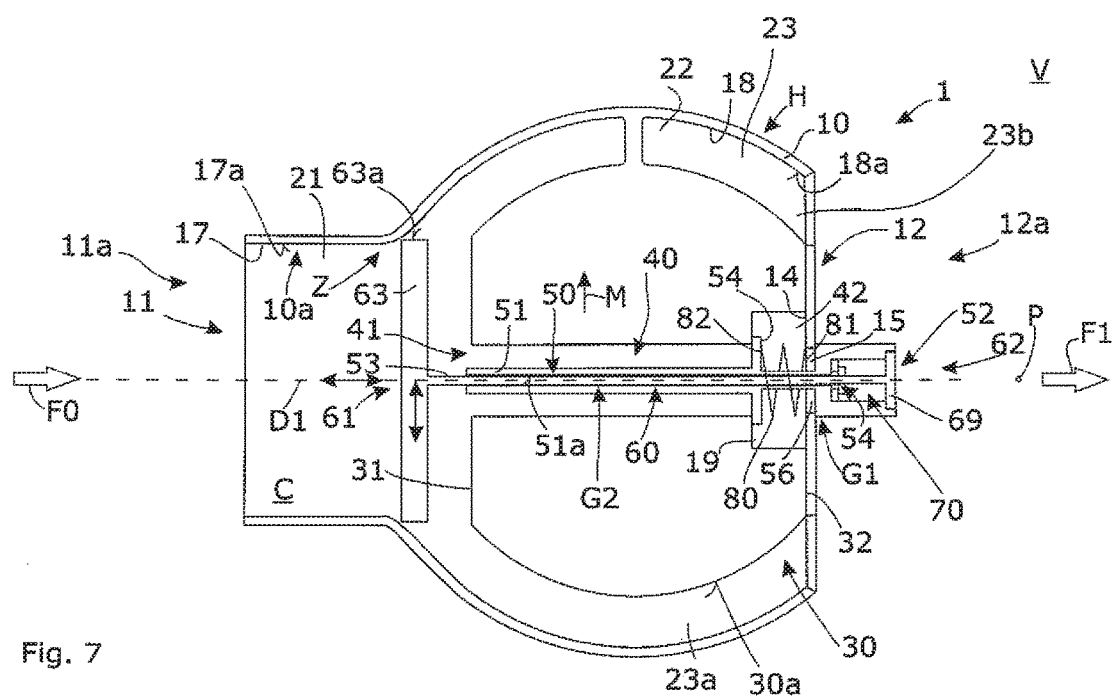

The embodiment of FIGS. 6 and 7 comprises a guiding device G1 which can be considered as a first guiding device G1 and an airflow adjustment member 63 connected to and guided in the guiding device G1 for moving the adjustment member 63 in a direction across the housing axis D1. The adjustment member 63 extends across the housing axis D1. In the embodiment shown in FIG. 6, a platelike adjustment member 63 is provided. In another embodiment, the adjustment member can be a spherical segment (see FIG. 2).

According to the embodiment shown in FIG. 1, the guiding device G1 can comprise two guiding surfaces which face each other and between which the adjustment member 63 is located. In the embodiment of FIG. 6, the adjustment member 63 is disposed at the end of inner body 30 which faces the air inlet opening 11.

By the guiding device G1, the adjustment member 63 can be moved in a direction across the housing axis D1. An actuation rod 60 can be fixed to the adjustment member 63 which extends along the housing axis D1 in a recess. At the end of the actuation rod 60 a handling device 69 can be formed which can lie outside the housing H in order to manually move the adjustment member 63 in different adjustment states. The adjustment member 63 is moveable between a first adjustment state in which the airflow adjustment member 63 at least partially extends into the first circumferential section and is completely or at least partially removed from the second circumferential section and a second adjustment state in which the airflow adjustment member 63 is completely or at least partially removed from the first circumferential section and extends at least partially into the second circumferential section in order to change the ratio of the volumetric flows of the intersecting first and second air flow component.

A further embodiment of the outlet device 1 for ventilation of a vehicle interior V according to the invention is shown in FIG. 6. The outlet device 1 comprises a housing H with a housing wall 10 having an outer air guide surface 10a which delimits a channel C which extends along a housing axis D1 of the housing H. The housing wall 10 with the channel C forms an air inlet orifice 11 at a first axial end 11a of the housing wall 10 and an air outlet orifice 12 at a second axial end 12a of the housing wall 10 lying contrary to the air inlet opening 11 with respect to the housing axis D1. In this regard the housing wall 10 comprises an inlet section 17 with an inlet section surface 17a at its inner side and an outlet section 18 with an outlet section surface 18a at its inner side which is joined to the inlet section surface 17a when viewed in the housing axis D1. The inlet section surface 17a and the outlet section surface 18a form an outer air guide surface 10a. The inlet section 17 forms the air inlet orifice 11 and the outlet section 18 forms the air outlet orifice 12 lying opposite to the air inlet orifice 11 with respect to the housing axis D1 of the housing H.

Herein, generally the outlet section 18 extends over the length of the inner air guide surface 30a when viewed along the housing axis D1.

The housing H further comprises an inner body 30 which is located within the housing wall 10 and fixed thereto. The inner body 30 comprises a first end 31 which faces the first axial end 11a of the housing wall 10 and, with respect to the housing axis D1, lies at or near the air inlet orifice 11, a second end 32 which faces the second axial end 12a of the housing wall 10 and, with respect to the housing axis D1, lies at the air outlet orifice 12. The inner body 30 comprises an inner air guide surface 30a which is actually the outer surface of the inner body and which faces the outer air guide surface 10a particularly within the outlet section 18 of the housing wall 10. The inner body 30 is positioned within the outer air guide surface 10a such that the outer air guide surface 30a of the inner body 30 and the outer air guide surface 10a, particularly the outlet section surface 18a thereof, form an outlet channel section 22 of the channel C. The outlet flow channel 22 comprises an end section 23 with respect to the housing axis D1. The end section 23 forms the air outlet orifice 12.

Preferably, the housing H is formed such that a single outlet channel section 22 extends completely circumferentially around the housing axis D1. In this case, the first and a second circumferential section C1, C2 are partial sections of one continuous end section 23.

The end section 23 of the outlet flow channel 22 can comprise at least a first circumferential section C1 and a second circumferential section C2 which are disposed in a circumferential direction with regard to the housing axis D1 in a circumferential distance to each other. The circumferential sections C1, C2 may also lie beneath each other. When an inlet air flow passes the air inlet orifice 11, a first air flow component flows through the first circumferential section C1 and a second air flow component flows through the second circumferential section C2. The first circumferential section C1 and the second circumferential section C2 extend towards each other when viewed across the housing axis D1, so that, when an inlet air flow passes the air inlet orifice 11, the first air flow component and the second air flow component intersect meet and influence or deviate each other after exiting the housing H in an intersecting point P.

Figure 5:
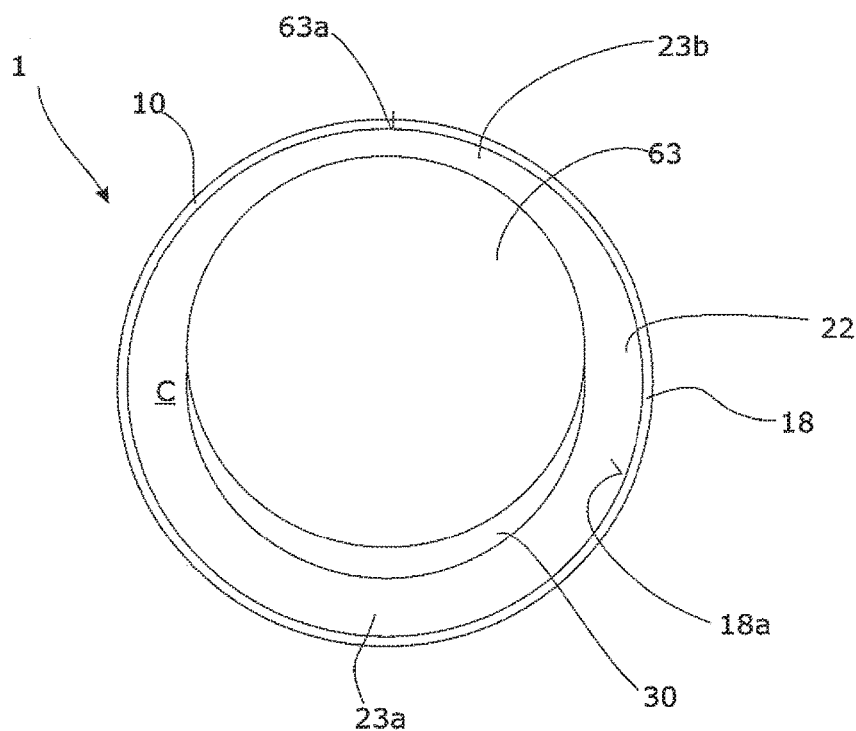

The adjustment member 63 is moveable between a first adjustment state in which the airflow adjustment member 63 at least partially extends into the first circumferential section C1 (radial gap A1 in FIG. 5) and is completely or at least partially removed from the second circumferential section C2 (radial gap A2 in FIG. 5) and a second adjustment state in which the airflow adjustment member 63 is completely or at least partially removed from the first circumferential section C1 and extends at least partially into the second circumferential section C2 in order to change the ratio of the volumetric flows of the intersecting first and second air flow component.

As shown in FIG. 6, the inner body 30 can comprise a through-hole 40 which extends along the housing axis D1 of the housing H through the inner body 30 between its first end 31 by forming a first opening 41 and a second end 32 by forming a second opening 42.

Generally, the outlet device 1 can further comprise an actuation device A in form of an actuation rod 60 which preferably extends through the outlet orifice 12 to the outside of the housing wall 10 so that the actuation rod 60 and thereby the adjustment member 63 can be moved manually. The first guiding device G1 can comprise guiding surfaces of the housing wall 10 which extend across the housing axis D1 and which receive the actuation rod 60 or a holding member of the actuation rod 60 connected to the same. Thereby, the first guiding device provides a movement of the actuation rod 60 across the housing axis D1. The housing wall extending across the housing axis D1 provides an opening or openings forming the air outlet orifice.

The outlet device 1 can further comprise a second guiding device G2 which can comprise a sleeve device 50, an actuation rod 60 and the adjustment member 63: The sleeve device 50 particularly comprises a sleeve 51 which extends with its longitudinal direction through the through-hole 40 and comprises a passageway 55 extending through the sleeve device 50 and the sleeve 51, respectively, by forming a first opening 53 which, with respect to the housing axis D1, is located at or near the first end 31 of the inner body 30 and a second opening 54 which, with respect to the housing axis D1, is located at or near the second end 32 of the inner body 30. Preferably, the first opening 53 lies outside the inner body 30 with respect to the housing axis D1. Preferably, the second opening 54 lies outside the inner body 30 with respect to the housing axis D1.

The actuation rod 60 is moveably disposed within the passageway 55 such that, by the second guiding device G2, it is guided therein by contacting an inner circumferential surface 51a forming the passageway 55. The actuation rod 60 comprises a first rod end 61 which is located outside the first opening 53 with respect to the housing axis D1 and outside the inner body 30 with respect to the housing axis D1 and a second rod end 62 which is disposed contrary to the first rod end 61. At or on the first rod end 61 a knob or any other handling device 69 can be formed or can be attached in the case a manual actuation is to be provided.

The adjustment member 63 is fixed at the second rod end 62. Preferably, the adjustment member 63 is movable within outer air guide surface 10a and particularly within the inlet section surface 17a of the inlet section 17 along the housing axis D1. The adjustment member 63 and the outer air guide surface 10a and, respectively, the inlet section surface 17a of the inlet section 17 are formed such that the adjustment member 63 in a closing position closes the channel C, when the actuation rod 60 is in a first rod position, and that the adjustment member 63 in an opening position opens the channel C, when the actuation rod 60 is in a second rod position. The adjustment member 63 closes the channel C when its circumferential edge section which extends around the housing axis D1 abuts the outer air guide surface 10a. In this state the actuation rod 60 and the sleeve 51 are in a respective neutral position with regard to the housing axis D1. Further, the adjustment member 63 opens the channel C when its circumferential edge section 63a is removed from the outer air guide surface 10a and leaves a gap Z between the circumferential edge section 63a and the outer air guide surface 10a at least over a partial section of the circumference of the outer air guide surface 10a around the housing axis D1. The adjustment member 63 can also be used to regulate the air flow volume by varying the second rod position.

The outlet device 1 further comprises the first guiding device G1 for providing a guided movement of the sleeve 51 relative to the housing H across the housing axis D1. The first guiding device G1 can be realized by a guiding surface of the sleeve 51 or of a component disposed at the sleeve 51 and by a guiding surface 14 of the housing H which alternately face and engage or contact each other so that the sleeve 51 is in a fixed position with regard to the housing axis D1 during movement of the sleeve 51 across the housing axis D1.

In this regard, the housing 10 can comprise a recess 15 at its second end 32 which has a form which largest width is larger than the diameter of an axial section 56 of the sleeve device 50 or of the sleeve 51 lying within the recess 15 so that the sleeve 51 can be moved at least in a first vertical direction V across the housing axis D1, when the adjustment member 63 is in its opened position. Thereby the adjustment member 63 is moved from a neutral position to a dislocated position in order to adjust the outlet flow direction in the same direction in which the adjustment member 63 is moved (FIG. 8) as a first partial flow along the inner body 30 with the higher throughput deviates a second partial flow along the inner body 30 with the lower throughput lying opposite to the first partial flow with respect to the housing axis D1. The recess 15 can have a circular form or an ellipsoid form in order to provide movements of the axial section 56 and, by the guiding device G, of the sleeve device 50 in a plane which extends across the housing axis D1. The recess 15 can have the form of a slit in order to provide movements in or versus a specific direction across the housing axis D1.

Figure 8:
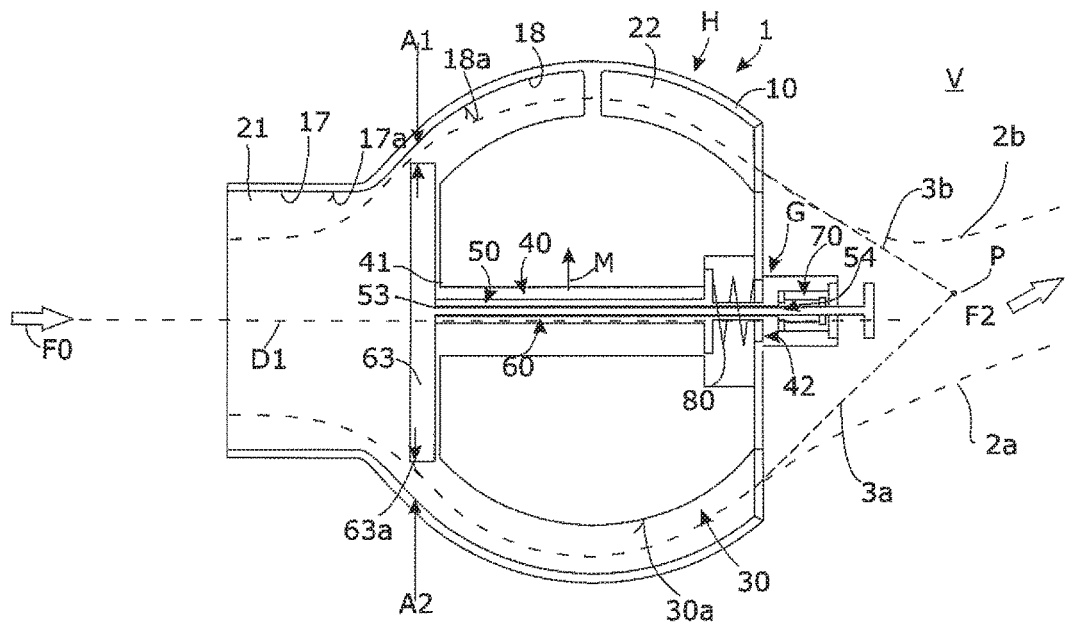
Figure 9:
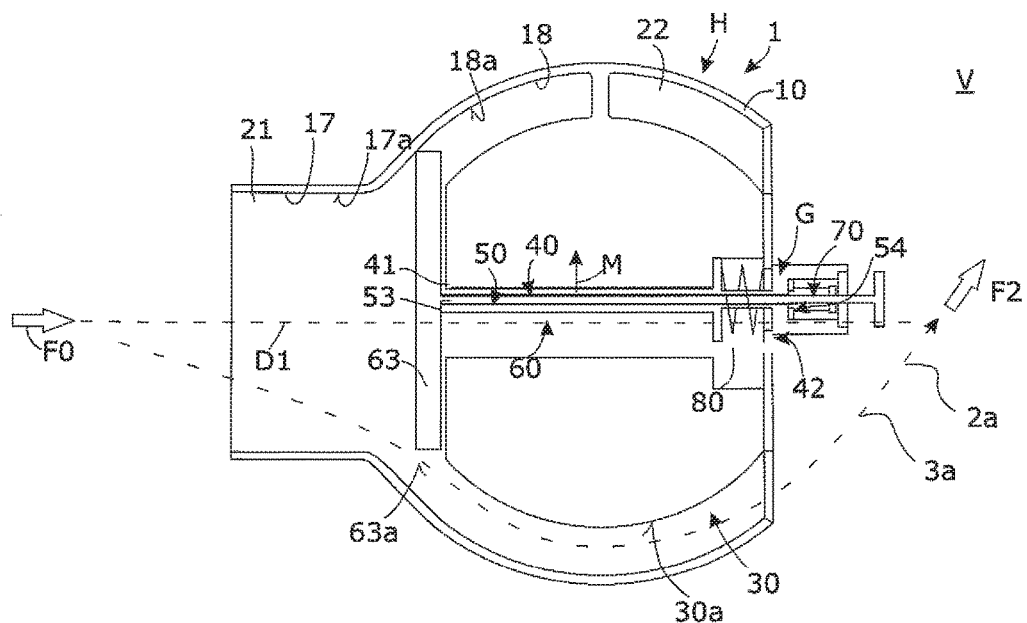

As an alternatively thereto, as shown in FIG. 8, the guiding device G can comprise a biasing device 80. The biasing device 80 comprises a first surface or end 81 facing the air inlet opening 11 and which is pressed against a guiding surface 54 of the sleeve device 50 or the sleeve 51 facing the air outlet orifice 12 and a second surface 82 lying contrary to the first surface or end 81 and which is pressed against a second guiding surface 14 of the housing H and particularly of the housing wall 10 or the inner body 30. The biasing device 80 is configured as a compressing biasing device 80 which means that the biasing device 80 is biased such that the first surface 81 and the second surface 82 of the biasing device 80 are pressed apart from each other. Particularly, the biasing device 80 can be formed as compression spring. The biasing device 80 is, with regard to its exerting biasing force, dimensioned such that the biasing device 80 can be moved relative to the housing H across the housing axis D1 by moving the actuation rod 60, particularly the second end 62 of the actuation rod 60, across the housing axis D1. In this embodiment, the guiding device G is realized by an abutment of the first surface or end 81 and the guiding surface 54 of the sleeve device 50 and by an abutment of the second surface or end 82 and the guiding surface 14 of the housing 10.

The outlet device 1 can comprise a positioning device 70 which is coupled to the actuation rod 61 and the sleeve device 50. The positioning device 70 is configured such that it moves the actuation rod 60 between the first rod position and the second rod position. The positioning device 70 can further be configured such that it provides the first rod position and the second rod position each as stable position in which the actuation rod 60 is axially fixed. In this regards, the positioning device 70 can be realized as push-push-mechanism. The positioning device 70 can be situated or integrated in a recess 19 of the housing H and the inner body 30, respectively.

In the following, the operation of embodiments of the outlet device 1 is described:

In the intended operation conditions of the outlet device 1 an air flow having an inlet flow direction F0 flows into the air inlet opening 11 and an air flow having an discharge flow direction F1, F2, F3 discharges the air outlet opening 12.

The comparison of the FIGS. 6 and 7 show that by displacement of the adjustment member 63 from the outer air guide surface 10a a gap Z is formed through which air which flows through the 11 passes the gap Z and the outlet section 18 so that the air flow discharges through the outlet opening 12. The outlet device 1 can be configured such that when, as shown in FIGS. 1 and 2, the sleeve 51 is in a neutral position with regard to the housing axis D1 and within a vertical plane in which the housing axis D1 is lying, the same throughput of air passes the gap Z on both sides of the adjustment member 63. In this regard, the outer air guide surface 10a can have a rotation-symmetric form. In this case, the discharge flow direction F1 has the same direction as the housing axis D1.

When the adjustment member 63 is displaced from the outer air guide surface 10a at a circumferential area and a gap Z is formed or increased in this circumferential area, the actuation rod 60 or the sleeve 51 can be dislocated in a direction across the housing axis D1 from its neutral position. Thereby a gap Z between the circumferential edge section and the outer air guide surface 10a in this circumferential area is generated over only a partial section of the circumference of the outer air guide surface 10a extending around the housing axis D1. If the actuation rod 60 or the sleeve 51 is dislocated in a first dislocation direction M across the housing axis D1 according to FIG. 3, the direction F2 of the discharge air flow is deviated and has a velocity component in the direction of the first dislocation direction. In FIG. 4 the actuation rod 60 or the sleeve 51 is more dislocated in a first dislocation direction across the housing axis D1 according to FIG. 3, the direction F2 of the discharge air flow is deviated and has a velocity component in the direction of the first dislocation direction.

The invention claimed is:

1. Outlet device for ventilation of a vehicle interior by generating an outlet flow, the outlet device comprising a housing with:
   an outer air guide surface which extends between an air inlet orifice and an air outlet orifice lying contrary to the air inlet orifice with respect to a housing axis of the housing, wherein the outer air guide surface extends continuously around the housing axis,
   an inner air guide surface which extends continuously around the housing axis and is spaced away from and faces toward the outer air guide surface, wherein the inner air guide surface and the outer air guide surface form an outlet flow channel, wherein an end section of the outlet flow channel which forms the air outlet orifice comprises at least a first circumferential section and a second circumferential section which are disposed with regard to the housing axis in a circumferential distance to each other, wherein imaginary extensions of the first circumferential section and the second circumferential section from and outward of the air outlet orifice meet each other in an intersection point which lies outside the housing at the side of the air outlet orifice, so that, caused by an inlet air flow which passes the air inlet orifice, a first air flow component flowing through the first circumferential section and a second air flow component flowing through the second circumferential section deflect each other after exiting the housing,
   an airflow adjustment member which has a cross-sectional diameter perpendicular to the housing axis at a position along the housing axis which is smaller than a cross-sectional diameter of the outlet flow channel at the same position along the housing axis, and which is movable in a direction across the housing axis for obstructing an air flow in one of the first or second circumferential section and for changing the ratio of the volumetric flows of the first and second air flow component and thereby the direction of the outlet flow, and
   a guiding device for guiding the airflow adjustment member in a direction across the housing axis.

2. Outlet device according to claim 1, wherein the airflow adjustment member is disposed within the inner air guide surface in a neutral position of the airflow adjustment member when viewed across the housing axis.

3. Outlet device according to claim 1, wherein the airflow adjustment member is disposed at the end of the inner air guide surface which faces the air inlet orifice.

4. Outlet device according to claim 1, wherein the first circumferential section and the second circumferential section are lying diametrically opposite to each other.

5. Outlet device according to claim 1, wherein the outlet device comprises a further guiding device which provides translational movement of the airflow adjustment member which is directed along the housing axis.

6. Outlet device according to claim 1, wherein the airflow adjustment member is coupled to a motor which is configured to move the adjustment member.

7. Outlet device according to claim 1, wherein the outlet device comprises an actuation rod which is fixed to the airflow adjustment member and which can be manually moved for obstructing an air flow in the outlet flow channel.

8. Outlet device according to claim 1, wherein the outlet device comprises an inner body which is located in the housing and fixed thereto, the inner body comprising a first end facing the air inlet orifice, a second end being oriented contrary to the first end, wherein the inner body comprises the inner air guide surface which faces the outer air guide surface to form the outlet flow channel.

9. Outlet device according to claim 8, wherein the outlet device comprises a second guiding device for guiding the airflow adjustment member in a direction along the housing axis, which outlet device comprises:
   a through-hole which extends along the housing axis through the inner body,
   a sleeve device which extends through the through-hole and which comprises a passageway extending through the sleeve device,
   an actuation rod being moveably disposed within the passageway and guided therein, the actuation rod comprising a first rod end and a second rod end which is disposed contrary to the first rod end,
   wherein the airflow adjustment member is fixed at the second rod end,
   wherein the actuation rod extends through the passageway and is moveable in a direction of the housing axis between a first rod position and a second rod position,
   wherein the adjustment member in the first rod position circumferentially contacts the outer air guide surface in a closing position and thereby closes the outlet flow channel and wherein the adjustment member in the second rod position opens the channel in an opening position,
   wherein the first guiding device couples and guides the sleeve device at the housing across the direction of the housing axis of the housing when the airflow adjustment member is in the opening position.

10. Outlet device according to claim 1, further comprising:
   an inner body located in and fixed to the housing, wherein the inner body comprises the inner air guide surface that faces the outer air guide surface to form the outlet flow channel;
   an actuation rod having one end fixed to the airflow adjustment member and a handling device formed at another end of the actuation rod, wherein the guiding device guides the actuation rod, and thereby the airflow adjustment member, in said direction across the housing axis relative to the inner body.

\* \* \* \* \*